United States Patent [19]

Kimura

[11] Patent Number: 5,477,748
[45] Date of Patent: Dec. 26, 1995

[54] KINETIC ENERGY REGENERATING DEVICE

[75] Inventor: Akira Kimura, Tokyo, Japan

[73] Assignee: Sony Corporation, Tokyo, Japan

[21] Appl. No.: 208,283

[22] Filed: Mar. 10, 1994

[30] Foreign Application Priority Data

Mar. 16, 1993 [JP] Japan .................... 5-080267

[51] Int. Cl.⁶ ............................ G05G 1/00; F16H 33/02
[52] U.S. Cl. ................. 74/572; 74/64; 475/166
[58] Field of Search ................... 74/64, 572, 573 R, 74/574; 475/166, 186

[56] References Cited

U.S. PATENT DOCUMENTS

| | | |
|---|---|---|
| 2,005,974 | 6/1935 | Hutchison . |
| 3,289,486 | 12/1966 | Horvath ........................ 74/64 |
| 3,293,928 | 12/1966 | Heister ......................... 74/64 |
| 4,141,256 | 2/1979 | Wilson et al. ................. 74/64 |
| 4,608,875 | 9/1986 | Wallace ........................ 74/64 |
| 4,928,553 | 5/1990 | Wagner . | |
| 5,024,637 | 6/1991 | Guichard ................... 475/166 |
| 5,134,894 | 8/1992 | Tam ............................ 74/64 |

FOREIGN PATENT DOCUMENTS

| | | |
|---|---|---|
| 678401 | 3/1930 | France . |
| 2267897 | 11/1975 | France . |
| 2521410 | 11/1976 | Germany . |
| 61-192965 | 8/1986 | Japan ........................ 74/64 |
| 5-60176 | 3/1993 | Japan ........................ 74/64 |
| 1330386 | 8/1987 | U.S.S.R. .................... 74/64 |

Primary Examiner—Vinh T. Luong
Attorney, Agent, or Firm—Ronald P. Kananen

[57] ABSTRACT

A kinetic energy regenerating device utilizes the principle of perfectly elastic collision through an elastic member between a rotating body on the driving side and a flywheel to regenerate kinetic energy at a high regenerating efficiency. The kinetic energy regenerating device (1) comprises a main shaft (2) connected to the output shaft of a driving arrangement, a main disk (5) fixedly mounted on the main shaft (2), a first rotor (6) supported on the main shaft (2) for rotation relative to the main shaft (2), a flywheel (10) supported on the main shaft (2) for rotation relative to the main shaft (2), a first clutch (9) for engaging the main disk (5) and the first rotor (6) and disengaging the same from each other, and a torsion coil spring (16) elastically interlocking the first rotor (6) and the flywheel (10). The rotational energy of the main disk (5) is transmitted through the first clutch (9) to the first rotor (6) to rotate the flywheel (10) and, at the same time, to twist the torsion coil spring (16).

21 Claims, 4 Drawing Sheets

FIG. 7

KINETIC ENERGY REGENERATING DEVICE

BACKGROUND OF THE INVENTION

1. Field of the Invention

The present invention relates to a kinetic energy regenerating device for recovering the kinetic energy of a rotating body and, more particularly, to a kinetic energy regenerating device capable of operating at a high regenerating efficiency by using the perfectly elastic collision between a rotor on the driving side and a flywheel separated from each other by an elastic member.

2. Description of the Related Art

Generally, a conventional kinetic energy regenerating device drives a generator by the rotative force of a rotary body to convert the rotational energy into electric energy by the generator and, in a regenerating mode, a motor or the like is driven by the electric energy to produce rotative force.

Since the conventional kinetic energy regenerating device must convert rotational energy into electric energy and convert the electric energy into rotational energy in the regenerating mode, a large amount of energy loss is incurred by energy conversion and, hence, the regenerating efficiency of the kinetic energy regenerating device is not very high.

SUMMARY OF THE INVENTION

To solve the low efficiency problem of the conventional kinetic energy regenerating device, the present invention provides a kinetic energy regenerating device comprising a main disk to be driven for rotation by a driving means, a first rotary body supported for free rotation on a main shaft, a flywheel supported for free rotation on the main shaft, a first clutch for engaging the main disk and the first rotary body and disengaging the same from each other, and an energy storage means interposed between the first rotary body and the flywheel to store energy temporarily.

In the kinetic energy regenerating device in accordance with the present invention, the rotative force of the main shaft is transmitted through the clutch to the first rotary body, and the first rotary body transmits the rotative force transmitted thereto through the energy storage means to the flywheel. Therefore, the energy storage means is able to transmit most of the rotative force to the flywheel while converting part of the rotational energy of the first rotary body into elastic energy and temporarily storing the elastic energy, and the rotational energy is not converted into electric energy. Accordingly, energy loss incurred by energy conversion is very small and the regenerating efficiency of the kinetic energy regenerating device is very high. More specifically, a first aspect of the present invention resides in a kinetic energy regenerating device comprising: a main shaft connected to the output shaft of a driving means; a main disk fixedly mounted on the main shaft; a first rotating body supported on the main shaft for rotation relative to the main shaft; a flywheel supported on the main shaft for rotation relative to the main shaft; a first clutch for engaging the main disk and the first rotating body; and an energy storage means interposed between the first rotating body and the flywheel for storing part of the total rotational energy of the main shaft temporarily in elastic energy and transmitting the total rotational energy to the flywheel, and for storing part of the total rotational energy of the flywheel temporarily in elastic energy and transmitting the rotational energy of the flywheel to the main shaft.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE INVENTION

A kinetic energy regenerating device in a preferred embodiment will be described hereinafter as installed in an XY robot between a ball-screw and a driving motor for driving the ball-screw.

Figure 1:
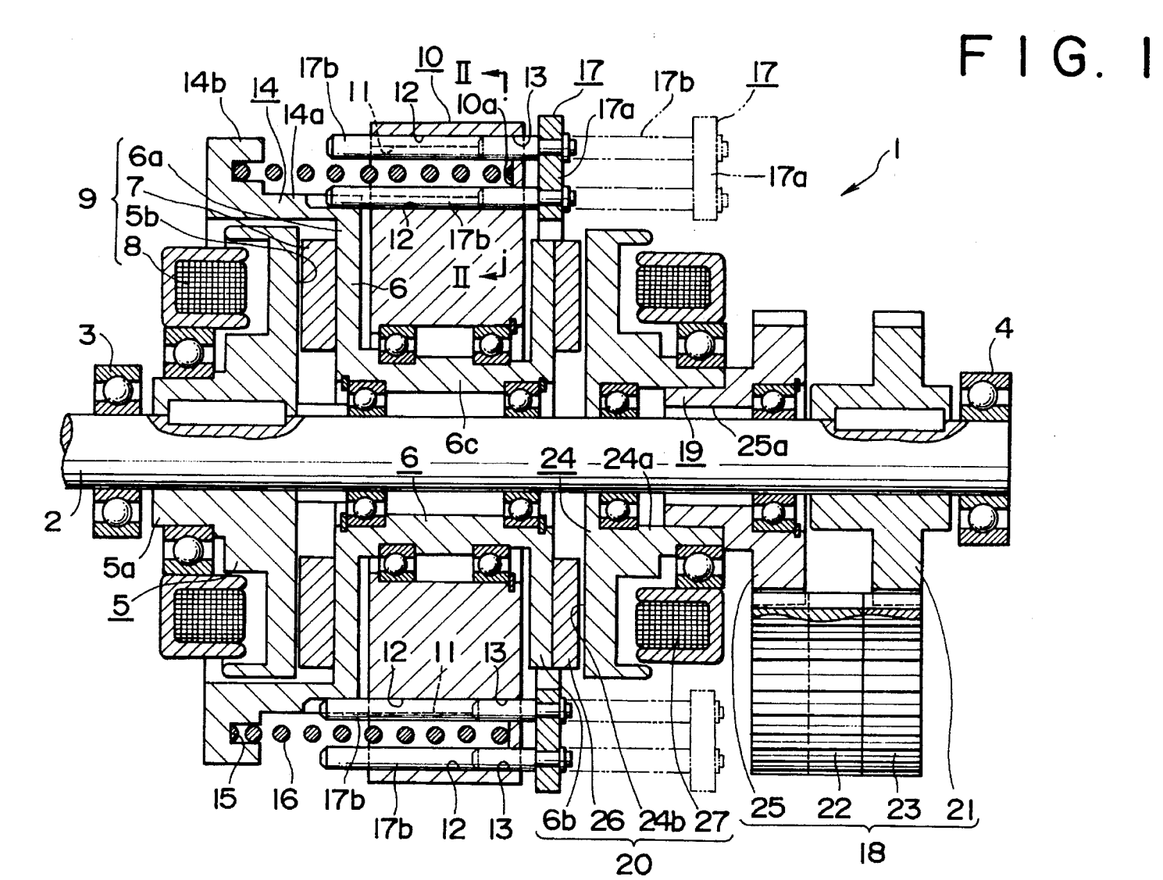
FIG. 1 is a central, longitudinal sectional view of a kinetic energy regenerating device according to a preferred embodiment of the present invention.

Referring to FIG. 1, a kinetic energy regenerating device 1 according to a preferred embodiment of the present invention is shown in a central, longitudinal sectional view. A main shaft 2 has one end connected to the output shaft of a driving motor (not shown), and the other end connected to a ball-screw (not shown). The shaft 2 is supported for rotation in bearings 3 and 4 on a housing (not shown). A main disk 5 is fixedly mounted on the main shaft 2. The main disk 5 has one end forming a boss 5a axially protruding in one direction, and the other end forming a smooth, flat surface 5b perpendicular to the axis thereof. The flat surface 5b of the main disk 5 serves as a functional surface of a first clutch 9, which will be described later. A first rotor 6 has a cylinder body 6c, a first flange 6a formed on one end of the cylindrical body 6c, and a second flange 6b formed on the other end of the cylindrical body 6c. The first rotor 6 is supported by ball bearings mounted on the main shaft 2 for rotation relative to the main shaft 2. An annular magnetic clutch plate 7 is fixed to the surface of the first flange 6a facing the flat surface 5b of the main disk 5. A coil 8 is supported by a ball bearing mounted on the boss 5a of the main disk 5 and fixed to the housing so that the coil 8 is positioned very close to the flat surface 5b of the main disk 5. The coil 8, the main disk 5, the first flange 6a of the first rotor 6 and the magnetic clutch plate 7 constitute the first clutch 9. Preferably, the first rotor 6 has the smallest possible mass. The second flange 6b of the first rotor 6 is one of the components of a second clutch 20, which will be described later.

Figure 2:
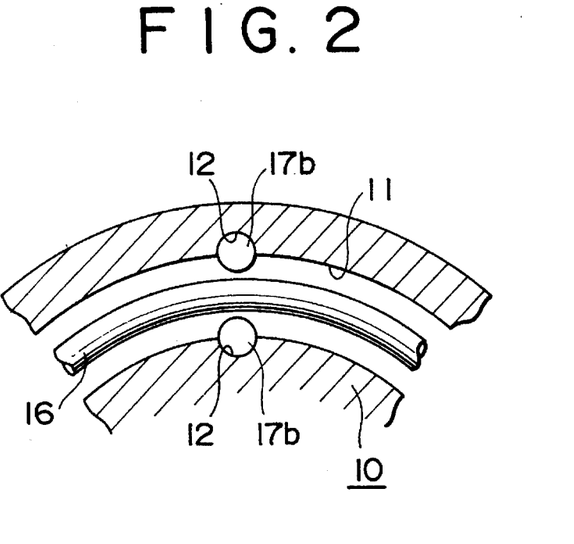
FIG. 2 is an enlarged end view taken along line II—II in FIG. 1.

An annular flywheel 10 having a thickness slightly smaller than the interval between the flanges 6a and 6b of the first rotor 6 is mounted on ball bearings put on the cylindrical body 6c of the first rotor 6 for rotation relative to the first rotor 6. A circular groove 11 is formed in the peripheral region of the end surface of the flywheel 10 facing the flange 6a. The depth of the circular groove 11 is slightly smaller than the thickness of the flywheel 10 and, therefore, the thickness of a part between the bottom surface 11a of the circular groove 11 and the end surface of the flywheel 10 opposite the surface in which the circular groove 11 is formed, i.e., the bottom wall 11a of the circular groove 11, is very small. As shown in FIG. 2, two pairs of axial grooves 12 having a semicircular cross section are formed diametrically opposite to each other in the inner and the outer circumference of the circular groove 11 of the flywheel 10. Circular holes 13 are formed through the bottom wall 11a of the circular groove 11 at positions respectively corresponding to the axial grooves 12 so as to be connected respectively to the axial grooves 12.

A spring bearing 14 has a cylindrical part 14a having an outside diameter substantially equal to the diameter of the inner circumference of the circular groove 11, a comparatively small axial length and one end integrally joined to the circumference of the first flange 6a. A spring hearing flange 14b extends from the other end of the cylindrical part 14a. A circular groove 15 having a central diameter equal to that of the circular groove 11 is formed in the surface of the spring hearing flange 14b facing the flywheel 10.

A torsion coil spring 16, i.e., an energy storage means, is interposed between the first rotor 6 and the flywheel 10 to store energy temporarily. The pitch diameter of the torsion coil spring 16 is equal to the central diameters of the circular groove 11 of the flywheel 10 and the circular groove 15 of the spring bearing flange 14b. The torsion coil spring 16 has one end fixed to the bottom surface of the circular groove 11 and the other end fixed to the bottom surface of the circular groove 15. Part of the torsion coil spring 16 is received in the circular groove 11 of the flywheel 10 and the rest of the same surrounds the cylindrical part 14a of the spring bearing 14. thus, the flywheel 10 and the first rotor 6 are interconnected by the torsion coil spring 16. When an external force is not applied to the torsion coil spring 16, the mean diameter of the torsion coil spring is equal to the central diameter of the circular groove 11 of the flywheel 10.

The elasticity modulus of the torsion coil spring 16 can be changed by means of an elasticity modulus adjusting device 17 consisting of an annular plate 17a having a width slightly greater than that of the circular groove 11 of the flywheel 10, and two pairs of round rods 17b projecting from the annular plate 17a respectively at diametrically opposite positions corresponding to the positions of the circular holes 13 of the flywheel 10. The rods 17bhave a diameter substantially equal to the diameter of the circular holes 13. The width of the space between each pair of rods 17b is slightly greater than the diameter of the wire forming the torsion coil spring 16. The rods 17b of the elasticity modulus adjusting device 17 are inserted respectively through the circular holes 13 in the circular groove 11 of the flywheel 10. In a state where no external force is applied to the torsion coil spring 16, the rods 17b are separated from the torsion coil spring 16. The elasticity modulus of the torsion coil spring can be adjusted by adjusting the depth of insertion of the rods 17b in the circular groove 11.

Figure 3:
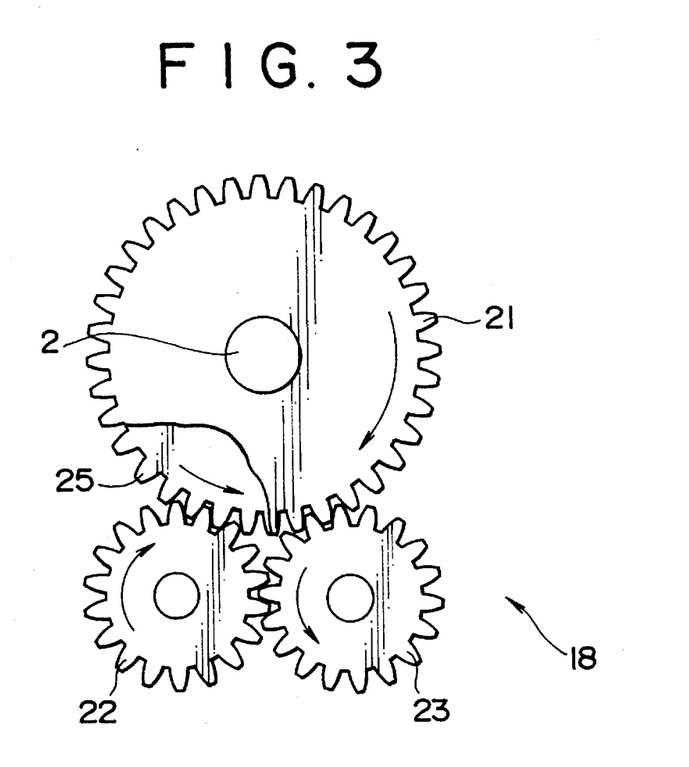
FIG. 3 is a side view of a reversing mechanism.

The main shaft 2 can be reversed after kinetic energy regeneration by reversing mechanism 18. The reversing mechanism comprises a second rotor 19 put on a ball bearing mounted on the main shaft 2 for rotation relative to the main shaft 2. The second clutch 20 functions to engage the second rotor 19 and the flange 6b of the first rotor 6 and disengage the same from each other. A spur gear wheel 21 is fixedly mounted on the main shaft 2. A first intermediate gear wheel 22 and a second intermediate gear wheel 23 are brought into engagement respectively with the spur gear wheel 21 and the second rotor 19, as shown in FIG. 3, to reverse the spur gear wheel 21 and the second rotor 19.

The second rotor 19 is formed by combining a circular plate 24 and a gear wheel 25. The circular plate 24 has a boss 24a extending toward the gear wheel 25, and the gear wheel 25 has a boss 25a extending toward the circular plate 24 and fitted in a force fit in the bore of the boss 24a of the circular plate 24. The circular plate 24 of the second rotor 19 has a smooth, flat end surface 24b perpendicular to its axis. The circular plate 24 having the flat end surface 24b is one of the components of the second clutch 20. The gear wheel 25 of the second rotor 19 and the spur gear wheel 21 have the same pitch diameter and the same module. An annular magnetic clutch plate 26 is attached to the surface of the second flange 6b of the first rotor facing the flat surface 24b of the circular plate 24. The magnetic clutch plate 26 and the flat surface 24b of the circular plate 24 of the second rotor 19 face each other and are separated from each other by a narrow space. A coil 27 is put on a ball bearing mounted on the boss 24a of the circular plate 24 of the second rotor 19 so as to be positioned close to the flat surface 24b of the circular plate 24 on the side of the boss 24a, and is fixed to the housing. The coil 27, the circular plate 24 of the second rotor 19 having the flat surface 24b, the second flange 6b of the first rotor 6, and the magnetic clutch plate 26 constitute the second clutch 20.

The first intermediate gear wheel 22 and the second intermediate gear wheel 23 have the same pitch diameter and the same module. The intermediate gear wheels 22 and 23 are mounted respectively on shafts (not shown) supported for rotation on the housing and are in engagement with each other and with the gear wheel 25 of the second rotor 19 and the spur gear wheel 21 at different angular positions, respectively. When the main shaft 2 is rotated clockwise, the second intermediate gear wheel 23 rotates counterclockwise, the first intermediate gear wheel 22 rotates clockwise, and the second rotor 19 rotates counterclockwise; that is, the second rotor 19 rotates in a direction reverse to the direction of rotation of the main shaft 2.

The kinetic energy regenerating device 1 transmits the rotational energy of the main shaft 2 to the flywheel 10 and stores the rotational energy as corresponding elastic energy in the torsion coil spring 16 to stop the main shaft 2. In the regenerating mode, the rotational energy of the flywheel 10 is transmitted to the main shaft 2 converting the rotational energy of the flywheel 10 into corresponding elastic energy by the torsion coil spring 16. The operation of the kinetic energy regenerating device 1 will be described hereinafter for an operating mode in which the reversing mechanism 18 is held inoperative to rotate the main shaft 2 in the same direction before and after kinetic energy regeneration.

In a state where the main shaft 2 and the main disk 5 are rotating, the first rotor 6 and the flywheel 10 are kept from rotation by inertia. When the first clutch 9 is engaged in this state, the first rotor 6 rotates at the same rotating speed as that of the main disk 5, because the moment of inertia of the first rotor 6 is far smaller than the sum of moments of inertia of the main shaft 2 and the rotating components rotatively connected to the main shaft 2 (e.g., the rotor of a driving motor for driving the main shaft 2 and the ball-screw connected to the main shaft 2). Therefore, it is preferable that the first rotor 6 has the smallest possible mass.

At the moment when the first clutch 9 is engaged, the flywheel 10 is kept from rotation by inertia. Consequently, the torsion coil spring 16 is strained by the rotational energy of the main disk 5 and the first rotor 6, and the rotation of the main disk 5 and the first rotor 6 is decelerated by the reactive resilience of the torsion coil spring 16. In this state, the rotational energy of the main disk 5 is stored as elastic energy in the torsion coil spring 16, and the quantity of the stored elastic energy is proportional to the twist in the torsion coil spring 16. Then, the flywheel 10 is caused to start rotating and the rotating speed of the flywheel 10 increases gradually after the first clutch 9 has been engaged by the twisted torsion coil spring 16.

Thus, the rotational energy of the main disk 5 is transmitted gradually to the flywheel 10, while part of the rotational energy of the main disk 5 is stored temporarily as elastic energy in the torsion coil spring 16. As the main disk 5 is decelerated, the twist in the torsion coil spring 16 increases and the rotating speed of the flywheel 10 increases gradually. Upon the increase of the twist in the torsion coil spring 16 to a maximum twist, a maximum elastic energy is stored in the torsion coil spring 16, and the stored elastic energy is used for rotating the flywheel 10 thereafter.

The elastic energy stored in the torsion coil spring 16 is used for the additional acceleration of the flywheel 10. After all the elastic energy stored in the torsion coil spring 16 has been used (i.e., after all the stress induced in the torsion coil spring 16 has been removed), the rotating speed of the flywheel 10 reaches a maximum rotating speed substantially equal to the initial rotating speed of the main disk 5 (i.e., the rotating speed of the main disk 5 before the engagement of the first clutch 9). At this time, the main disk 5 and the first rotor 6 are stopped. Simultaneously with the stopping of the main disk 5 and the first rotor 6 and the return of the torsion coil spring 16 to its original shape, the first clutch 9 is disengaged.

Thus, all the rotational energy of the main disk 5 is transmitted to the flywheel 10. Assuming that the moment of inertia of the first rotor 6 is zero because the first rotor 6 has a very small mass, the first rotor 6 starts rotating together with the flywheel 10 upon the disengagement of the first clutch 9.

Figure 4:
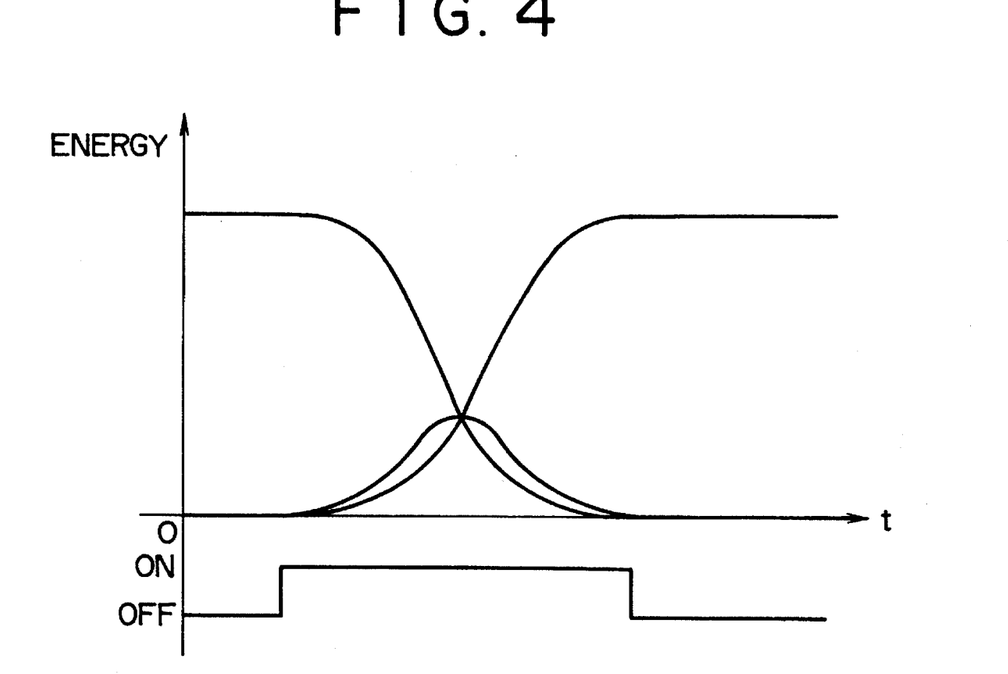
FIG. 4 is a graph showing the variation of energy stored in a rotary body, an energy storage means and a flywheel with the operating condition of a first clutch.

FIG. 4 is a graph showing the variation of quantities of energy stored in the components with time when the rotational energy of the main shaft 2 is transmitted to the flywheel 10 while part of the rotational energy of the main shaft 2 is stored as elastic energy in the torsion coil spring 16, in connection with the condition of the first clutch 9.

When regenerating kinetic energy, the first clutch 9 is engaged to interlock the first rotor 6 and the main disk 5. Upon the engagement of the first clutch 9, the first rotor 6 is interlocked with the stopping main disk 5 and, hence, the rotation of the first rotor 6 stops at the next moment. The inertia of the main disk 5 and the main shaft 2 tries to keep the main disk 5 and the main shaft 2 from turning. Thus, while the flywheel 10 is rotating, the torsion coil spring 16 is twisted. The flywheel 10 is decelerated by the reactive resilience of the torsion coil spring 16.

The main disk 5 and the first rotor 6, which were stationary at the moment when the first clutch 9 was engaged, are caused to start rotating by the resilience of the torsion coil spring 16. The rotating speeds of the main disk 5 and the first rotor 6 increase gradually. Thus, part of the rotational energy of the flywheel 10 is stored temporarily in elastic energy in the torsion coil spring 16, while the rotational energy of the same is transmitted gradually to the main disk 5 and the first rotor 6. The quantity of elastic energy stored in the torsion coil spring 16 is proportional to the twist in the torsion coil spring 16. As the flywheel 10 decelerates, the twist in the torsion coil spring 16 increases and the rotating speed of the main disk 5 increases gradually. Upon the increase of the twist in the torsion coil spring 16 to a maximum twist, a maximum elastic energy is stored in the torsion coil spring 16. The elastic energy stored in the torsion coil spring 16 is used for rotating the main disk 5 thereafter.

The main disk 5 and the first rotor 6 are further accelerated by the elastic energy supplied by the torsion coil spring 16. The rotating speed of the main disk 5 and the first rotor 6 reaches a maximum rotating speed substantially equal to the rotating speed of the flywheel 10 at the start of the regenerating operation (i.e., the rotating speed of the flywheel 10 immediately before the engagement of the first clutch 9). Upon the exhaustion of all the elastic energy stored in the torsion coil spring 16 (i.e., upon the return of the torsion coil spring 16 to its original shape), the flywheel 10 stops. Simultaneously with the stop of the flywheel 10 and the return of the torsion coil spring 16 to its original shape, the first clutch 9 is disengaged.

Thus, all the rotational energy of the flywheel 10 is transmitted to the main disk 5 and the main shaft 2 to complete the kinetic energy regenerating operation. Assuming that the moment of inertia of the first rotor 6 is zero because the first rotor 6 has a very small mass, the first rotor 6 stops together with the flywheel 10 upon the disengagement of the first clutch 9.

The quantity of elastic energy to be stored in the torsion coil spring 16 is adjusted by adjusting the depth of insertion of the rods 17b of the elasticity modulus adjusting device 17 in the circular groove 11. When the depth of insertion of the rods 17b in the circular groove 11 is increased, the length of a part of the torsion coil spring 16 extending between the rods 17b increases. When the torsion coil spring 16 is twisted, the pitch diameter of the torsion coil spring 16 increases or decreases and the wire of the torsion coil spring 16 comes into contact with the outer rods 17b or the inner rods 17b depending on the direction of twisting. Consequently, the pitch diameter of the torsion coil spring 16 is unable to increase or decrease any further. Only a part of the torsion coil spring 16 not in contact with the rods 17b is an effective part capable of storing elastic energy. Accordingly, the greater than depth of insertion of the rods 17b of the elasticity modulus adjusting device 17 in the circular groove 11, the smaller is the length of the effective part, and the greater is the elasticity modulus of the torsion coil spring 16, and vice versa.

The quantity of elastic energy which can be stored in the torsion coil spring 16 is proportional to the elasticity modulus of the torsion coil spring 16. Thus, the quantity of elastic energy stored in the torsion coil spring 16 and, hence, the rotational energy which can be quickly transmitted to or from the flywheel 10, increases when the depth of insertion of the rods 17b of the elasticity modulus adjusting device 17 is increased. As a result, the main disk 5 and the main shaft 2 can be stopped more quickly.

The reversing mechanism 18 is used for rotating the main shaft 2 in the reverse direction by the kinetic energy regenerating operation.

To operate the main shaft 2 in the reverse direction, the second clutch 20 is engaged to connect the first rotor 6 to the second rotor 19 in a state where the rotational energy of the main shaft 2 has been transmitted to the flywheel 10. In this state, the main shaft 2, the main disk 5, the second rotor 19, the spur gear wheel 21 and the intermediate gear wheels 22 and 23 are stopped, and the flywheel 10 and the first rotor 6 are rotating. Upon engaging the second clutch 20, the first rotor 6 stops momentarily, and the second rotor 19, the intermediate gear wheels 22 and 23, and the spur gear wheel 21 are kept from rotation by inertia. Consequently, the torsion coil spring 16 is twisted by the rotating flywheel 10, and the flywheel 10 is decelerated by the reactive resilience of the torsion coil spring 16. Then, the second rotor 19, the intermediate gear wheels 22 and 23, and the spur gear wheel 21 are caused to start rotating by the resilience of the torsion coil spring 16. The rotating speeds of the second rotor 19 and the gear wheels 21, 22 and 23 increase gradually.

Thus, part of the rotational energy of the flywheel 10 is stored in elastic energy in the torsion coil spring 16, while the rest is transmitted gradually to the second rotor 19, the intermediate gear wheels 22 and 23, and the spur gear wheel 21. Suppose, for example, that the flywheel 10 and the first rotor 6 are rotating in a clockwise direction. Upon engaging the second clutch 20, the second rotor 19 rotates clockwise, and the main shaft 2 rotates in a counterclockwise direction, which is reverse to the direction of rotation of the main shaft 2 before the engagement of the first clutch 9.

The twist in the torsion coil spring 16 increases and the rotating speed of the second rotor 19 increases with the deceleration of the flywheel 10. Upon the increase of the twist in the torsion coil spring 16 to a maximum twist, the elastic energy stored in the torsion coil spring 16 reaches a maximum elastic energy, and the elastic energy stored in the torsion coil spring contributes to driving the second rotor 19 for rotation thereafter. As the elastic energy stored in the torsion coil spring 16 is discharged, the second rotor 19 and the first rotor 6 are further accelerated. Upon the exhaustion of the elastic energy stored in the torsion coil spring 16 (i.e., upon the return of the torsion coil spring 16 to its original shape), the rotating speeds of the first rotor 6, the second rotor 19, the intermediate gear wheels 22 and 23, the spur gear wheel 21 and the main shaft 2 reach maximum rotating speeds equal to rotating speeds at the moment when the kinetic energy regenerating operation was started (i.e., rotating speeds immediately before the engagement of the second clutch 20). When the elastic energy in the coil spring 16 is exhausted, the flywheel 10 stops. Simultaneously with the stop of the flywheel 10 and the return of the torsion coil spring 16 to its original shape, the second clutch 20 is disengaged. Thus, all the rotational energy of the flywheel 10 is transmitted to the first rotor 6, the second rotor 19, the intermediate gear wheels 22 and 23, the spur gear wheel 21 and the main shaft 2 to complete the kinetic energy regenerating operation to rotate the main shaft 2 in the reverse direction.

The operation of the kinetic energy regenerating device will kinematically be explained hereinafter. In the following explanation, air resistance, frictional heat and such are neglected. It is assumed that the kinetic energy regenerating device is an ideal system, and only the intrinsic operation of the kinetic energy regenerating device will be described.

Figure 5:
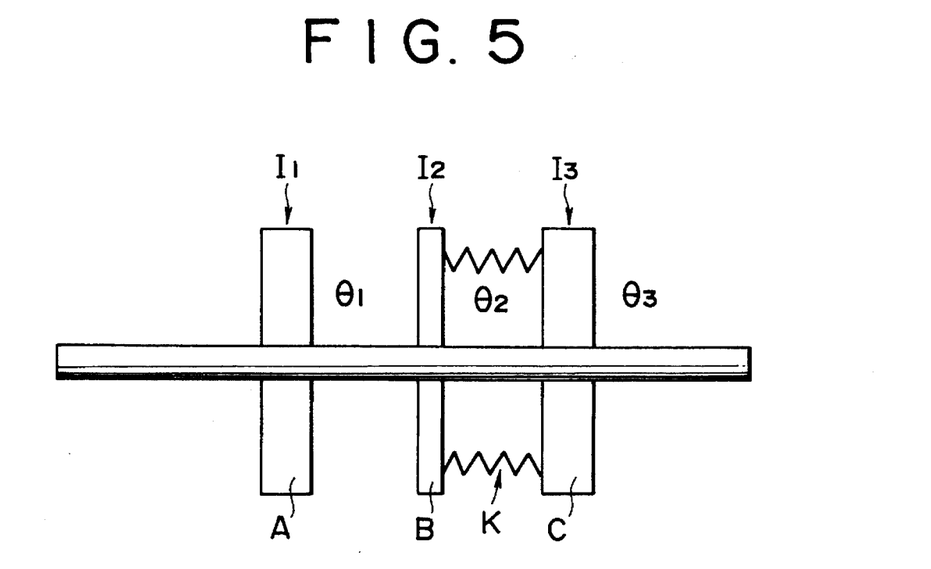
FIG. 5 is a diagrammatic view showing the principle on which a kinetic energy regenerating device in accordance with the present invention is based.

Suppose that disks A, B and C have moments of inertia $I_1$, $I_2$ and $I_3$, respectively, and $I_2 \ll I_1, I_3$ (i.e., the moment of inertia $I_2$ of the disk B is far smaller than those of the disks A and C). Angles of rotation of the disks A, B and C are $\theta_1$, $\theta_2$ and $\theta_3$, respectively. The n-th derivative with respect to time of a parameter is indicated by a symbol n-prime. An elastic body D has an elasticity modulus k.

The foregoing definition is tabulated in the following Table 1:

TABLE 1

| Symbols | Quantities |
|---|---|
| $I_1$ | Moment of inertia of the disk A |
| $I_2$ | Moment of inertia of the disk B |
| $I_3$ | Moment of inertia of the disk C |
| $\Theta_1$ | Angle of rotation of the disk A |
| $\Theta_2$ | Angle of rotation of the disk B |
| $\Theta_3$ | Angle of rotation of the disk C |
| v | Initial angular velocity of the disk A |
| k | Elasticity modulus |

Initial conditions of an initial state where only the disk A is rotating at a rotating speed V and the disks B and C are at a standstill are defined by the following expressions:

$$\begin{aligned}
\theta_1(0) &= 0 \\
\theta_1'(0) &= V \\
\theta_2(0) &= 0 \\
\theta_2'(0) &= 0 \\
\theta_3(0) &= 0 \\
\theta_3'(0) &= 0
\end{aligned} \quad (1)$$

Equations of motion for the disks A and C are the following simultaneous differential equations with two unknowns, which express that the rotating disk A is connected to the disk B and exerts dynamic influence through the elastic body D to the disk C, in which it is assumed that there is no slip between the disks A and B:

$$I_1 \cdot \theta_1'' + k \cdot (\theta_1 - \theta_3) = 0$$

$$I_3 \cdot \theta_3'' + k \cdot (\theta_3 - \theta_1) = 0 \quad (2)$$

In expression (2), the terms of θ of second order and higher are omitted on an assumption that a restoring force proportional to the difference in angle of rotation (i.e., $\theta_1 - \theta_3$) acts on the elastic body D. The following change of variables is used:

$$I_1 \cdot \theta_1 \equiv \Theta_1$$

$$I_3 \cdot \theta_3 \equiv \Theta_3 \quad 3)$$

Then, the initial conditions are expressed by:

$$\Theta_1(0) = 0$$

$$\Theta_1'(0) = I_1 \cdot V$$

$$\Theta_3(0) = 0$$

$$\Theta_3'(0) = 0 \quad (4)$$

and the dynamical equations are expressed by:

$$\Theta_1'' + \frac{k}{I_1} \times \Theta_1 - \frac{k}{I_3} \times \Theta_3 = 0 \quad (5)$$

$$\Theta_3'' + \frac{k}{I_3} \times \Theta_3 - \frac{k}{I_1} \times \Theta_1 = 0$$

The following expression (6) is obtained by adding the two differential equations represented by expression (2), and expression (7) is obtained through the change of variables of expression (3):

$$I_1 \cdot \theta_1'' + I_3 \cdot \theta_3'' = 0 \quad (6)$$

$$\Theta_1'' + \Theta_3'' = 0 \quad (7)$$

Expression (7) can readily be solved. The following expression (8) is obtained by solving expression (7) using the initial conditions represented by expression (4):

$$\Theta_1 + \Theta_3 = I_1 \cdot V \cdot t \qquad (8)$$

Ordinary differential equations with one unknown for $\Theta_1$ and $\Theta_3$ which can readily be solved, are obtained by substituting expression (8) into expression (4). The solutions are expressed by the following equations (9):

$$\Theta_1 = \frac{I_1 \times V}{\omega_0} \left( 1 - \frac{k}{I_3 \times \omega_0^2} \right) \times \sin(\omega_0 \times t) + \frac{I_1 \times k \times V}{I_3 \times \omega_0^2} \times t \qquad (9)$$

$$\Theta_3 = \frac{k \times V}{\omega_0^2} \times t - \frac{k \times V}{\omega_0^2} \times \sin(\omega_0 \times t)$$

where $$\omega_0 = \sqrt{k \times [(1/I_1) + (1/I_3)]}$$

Solutions for $\theta_1$ and $\theta_3$ obtained by using expression (4) are represented by expression (10), in which each of $\theta_1$ and $\theta_3$ is the sum of a first term proportional to time t, and a second term expressing an oscillation having an angular frequency $\omega_o$.

$$\theta_1(t) = \frac{1}{1+\alpha} \left[ V \times t + \frac{V}{\omega_0} \times \alpha \times \sin(\omega_0 \times t) \right] \qquad (10)$$

$$\theta_3(t) = \frac{1}{1+\alpha} \left[ V \times t - \frac{V}{\omega_0} \times \sin(\omega_0 \times t) \right]$$

where $$\alpha = \frac{I_3}{I_1}$$

In expression (10), the value of the parameter $\alpha(=I_3/I_1)$ represents the distinctive features of motion. For example, if the parameter $\alpha$ approaches an infinitesimal value, expression (10) can be written as:

$$\alpha \to 0 \qquad (11)$$
$$\theta_1(t) \to V \cdot t$$

$$\Theta_3(t) \to V \times t - \frac{V}{\omega_0} \times \sin(\omega_0 \times t)$$

where $\theta_1(t)$ is dependent mostly on the first term and varies substantially linearly, and $\theta_3(t)$ oscillates with respect to $V \cdot t$.

If $\alpha$ increases up to infinity, expression (10) can be written as:

$$\alpha \to \infty \qquad (12)$$

$$\theta_1(t) \to \frac{V}{\omega_0} \times \sin(\omega_0 \times t)$$

$$\Theta_3(t) \to 0$$

where $\theta_1(t)$ is dependent mostly on the second term and oscillates, and $\theta_3(t)$ approaches zero.

Figure 6:
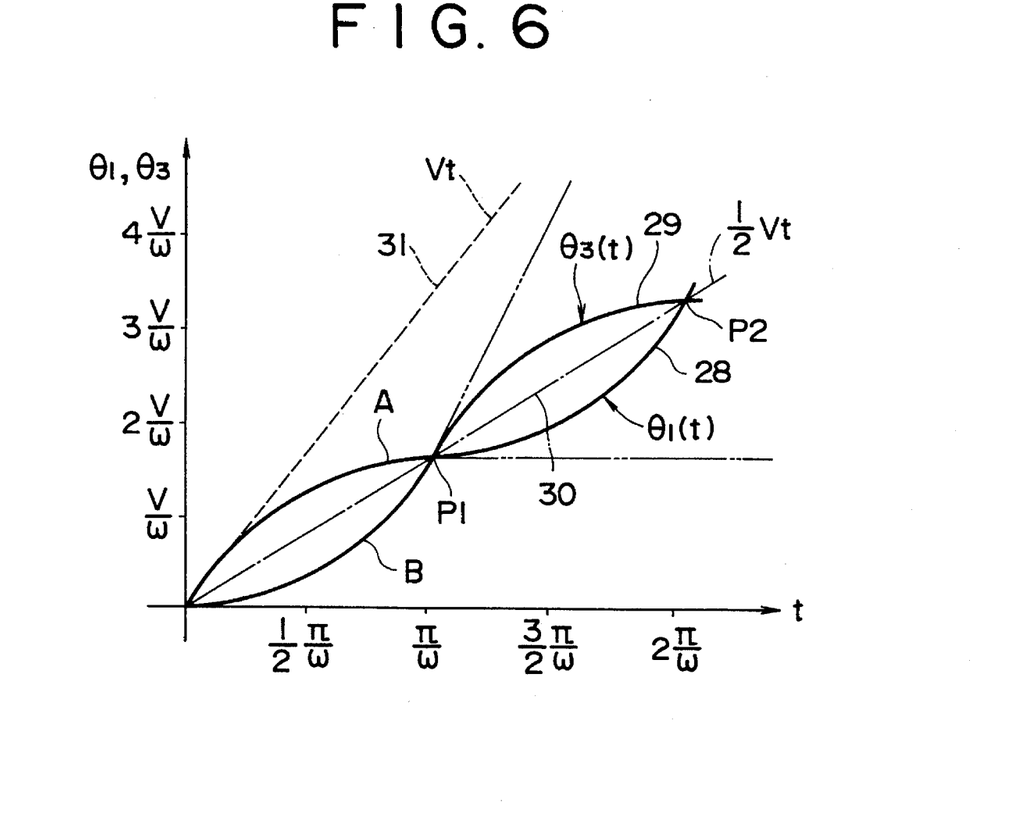
FIG. 6 is a graph showing the variation of angle of turning with time.

FIG. 6 is a graph showing a curve 28 for $\theta_1(t)$ and a curve 29 for $\theta_3(t)$ when $\alpha=1(I_1=I_3=I)$. In FIG. 6, a curve 30 indicated by an alternate long and short dash line represents the mean of $\theta_1(t)$ and $\theta_3(t)$ (i.e., $V \cdot t/2$), and a curve 31 indicated by a broken line represents $V \cdot t$.

The solutions of $\theta_1(t)$ and $\theta_3(t)$ are obtained by using the following expression obtained by rearranging expression (10) with $\alpha=1$.

$$\theta_1(t) = \frac{1}{2} \left[ V \times t + \frac{V}{\omega_0} \times \sin(\omega_0 \times t) \right] \qquad (13)$$

$$\theta_3(t) = \frac{1}{2} \left[ V \times t - \frac{V}{\omega_0} \times \sin(\omega_0 \times t) \right]$$

where $$\omega_0 = \sqrt{2k/I}$$

The following expression (14) representing angular velocities is obtained by differentiating expression (13) with respect to t:

$$\theta_1'(t) = \frac{1}{2} [V + V \times \cos(\omega_0 \times t)] \qquad (14)$$

$$\theta_3'(t) = \frac{1}{2} [V - V \times \cos(\omega_0 \times t)]$$

As is obvious from expression (14), when the clutch is engaged to connect the disks A and B, the angular velocity V of the disk A decreases from the initial angular velocity (i.e., the angular velocity immediately before the engagement of the clutch), while the angular velocity of the disk C increases with time. When the clutch is disengaged at time $t=\pi/\omega_o$ corresponding to a point $P_1$, the disks continue to rotate by inertia at the angular velocities at time $t=\pi/\omega_o$, as indicated by alternate long and two short dashed lines in FIG. 6; that is, the disk A stops and the disk C rotates at the angular velocity V.

Figure 7:
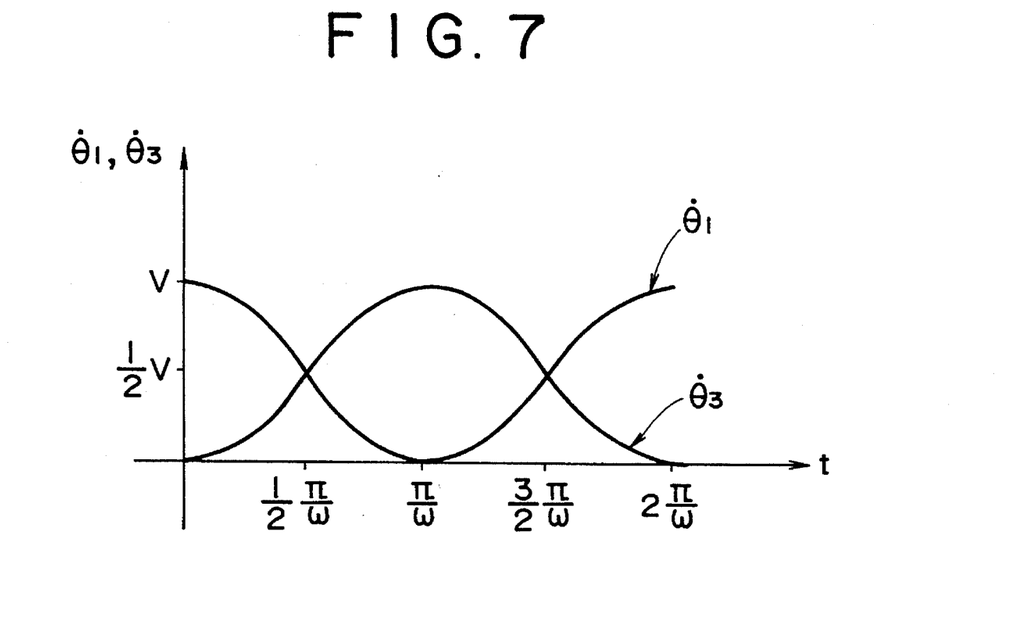
FIG. 7 is a graph showing the variation of angular velocity with time.

When the clutch is engaged thereafter to connect the disks A and B, the angular velocity of the disk C decreases and the angular velocity of the disk A increases. When the clutch is disengaged at a time corresponding to a point $P_2$, the disks A and B rotate at angular velocities corresponding to the initial angular velocities, respectively, to enable kinetic energy regeneration. As illustrated in FIG. 7, the angular velocities of the disks A and C are in an antiphase relationship with respect to $V \cdot t/2$.

Thus the disks A and C exchange purely mechanical energy without requiring any electrical energy converting means. Therefore, the efficiency of kinetic energy regeneration can be enhanced by reducing energy loss due to frictional heat and so forth. In contrast, enhancement of the efficiency of a kinetic energy regeneration employing electrical energy converting means must reduce Joule heat and such in addition to mechanical heat loss.

Although the kinetic energy regenerating device of the present invention employs the resilience of the torsion coil spring 16 as an energy storage means for temporarily storing energy, a pneumatic means may be employed for the same purpose instead of the resilience of the torsion coil spring 16. When employing a pneumatic means, a turbine may be driven by a first rotor provided with gear teeth on the circumference of the flange thereof to accumulate compressed air in an air tank having a given capacity. The flywheel may be driven for rotation by another turbine driven by the compressed air accumulated in the air tank.

When such a pneumatic means is employed, a variable-capacity air tank may be used as the elasticity modulus adjusting means. The transmission of energy to the flywheel and the decrease of the rotating speed of the main shaft to zero can be achieved in a comparatively short time, by reducing the capacity of the variable-capacity air tank, and vice versa.

The kinetic energy regenerating device may be used as a booster for driving a motor in the kinetic energy regenerating mode. When regenerating the energy of the main shaft stored in the flywheel for driving the main shaft by engaging the clutch, the kinetic energy regenerating device can be used as a booster by driving a motor for driving the main shaft simultaneously with or prior to the engagement of the clutch.

Although the present invention has been described in its preferred form with a certain degree of particularity, the shapes and construction of the disks, clutches, the first rotor, the gear wheels and other components of the embodiment described herein are intended to illustrate the general principles of the present invention and not to be construed to limit the scope of the invention. It is therefore to be understood that the above-described embodiments are merely illustrative of the principles of the invention. Various modifications and changes may be made thereto by those skilled in the art which will embody the principles of the invention and fall within the scope and spirit thereof.

What is claimed is:

1. A kinetic energy regenerating device comprising:
   a main shaft;
   a main disk fixedly mounted on said main shaft;
   a first rotating body supported on said main shaft for rotation relative to said main shaft;
   a flywheel supported on said main shaft for rotation relative to said main shaft;
   a first electromagnetic clutch for engaging said main disk and said first rotating body; and
   an energy storage means interposed between said first rotating body and said flywheel for storing part of a total rotational energy of said main shaft temporarily as elastic energy and transmitting the total rotational energy to said flywheel, and for storing part of the total rotational energy of the flywheel temporarily as elastic energy and transmitting the rotational energy of the flywheel to said main shaft.

2. The kinetic energy regenerating device according to claim 1, wherein the energy storage means is a torsion spring.

3. The kinetic energy regenerating device according to claim 2, wherein said flywheel includes a first circular groove, said torsion spring is a coil spring which is arranged coaxially about said main shaft, and a first end of said coil spring is received in the first circular groove, said coil spring undergoing a change in diameter when wound in response to the application of torsion 4. The kinetic energy regenerating device according to claim 3, wherein said first rotating body includes a second circular groove, and a second end of said torsion coil spring is received in the second circular groove.

5. The kinetic energy regenerating device according to claim 2, further comprising means for adjusting an elasticity modulus of said torsion spring.

6. The kinetic energy regenerating device according to claim 5, wherein said torsion spring is a coil spring which is coaxial with said main shaft, a first end of said coil spring is fixed to said flywheel, and a second end of said coil spring is fixed to said first rotating body.

7. The kinetic energy regenerating device according to claim 1, wherein said first rotating body has a moment of inertia which is much less than a moment of inertia of said flywheel, and wherein said energy storage means is a torsion spring.

8. The kinetic energy regenerating device according to claim 7, wherein said moment of inertia of said first rotating body is much less than a combined moment of inertia of said main shaft and said main disk.

9. The kinetic energy regenerating device according to claim 8, wherein said torsion spring is a coil spring having a first end fixed to said first rotating body and a second end fixed to said flywheel, said first rotating body being supported on said main shaft for rotation relative to said flywheel against a bias of said torsion spring.

10. The kinetic energy regenerating device according to claim 1, further comprising:
    a second rotating body mounted on said main shaft for rotation relative to said main shaft and interconnected with said main shaft by a reversing mechanism, and
    a second clutch for selectively engaging said first rotating body with said second rotating body.

11. The kinetic energy regenerating device comprising:
    a main shaft;
    a main disk fixedly mounted on said main shaft;
    a first rotating body supported on said main shaft for rotation relative to said main shaft;
    a flywheel supported on said main shaft for rotation relative to said main shaft;
    a first clutch for engaging said main disk and said first rotating body;
    an energy storage means interposed between said first rotating body and said flywheel for storing part of a total rotational energy of said main shaft temporarily as elastic energy and transmitting the total rotational energy to said said flywheel temporarily as elastic energy and transmitting the rotational energy of said flywheel to said main shaft, the energy storage means comprising a torsion coil spring having a first end fixed to said flywheel, and a second end fixed to said first rotating body; and
    means for adjusting an elasticity modulus of said coil spring, said adjusting means comprising an annular plate having a plurality of rods projecting therefrom, at least one of said rods extending adjacent an inner periphery of said coil spring, and at least one of said rods extending adjacent an outer periphery of said coil spring.

12. The kinetic energy regenerating device according to claim 11, wherein said rods are supported on said annular plate for movement in an axial direction for adjusting the elasticity modulus of said coil spring.

13. The kinetic energy regenerating device comprising:
    a main shaft;
    a main disk fixedly mounted on said main shaft;
    a first rotating body supported on said main shaft for rotation relative to said main shaft;
    a flywheel supported on said main shaft for rotation relative to said main shaft;
    a first clutch for engaging said main disk and said first rotating body; and
    an energy storage means interposed between said first rotating body and said flywheel for storing part of a total rotational energy of said main shaft temporarily as elastic energy and transmitting the total rotational energy to said flywheel, and for storing part of the total rotational energy of said flywheel temporarily as elastic energy and transmitting the rotational energy of said flywheel to said main shaft;

wherein said energy storage means is a torsion coil spring; and wherein said first clutch comprises a first magnetic clutch plate fixed to said first rotating body, and a first coil supported adjacent said main disk on an opposite side of said main disk with respect to said magnetic clutch plate, said magnetic clutch plate selectively engaging said main disk.

14. The kinetic energy regenerating device comprising:

a main shaft;

a main disk fixedly mounted on said main shaft;

a first rotating body supported on said main shaft for rotation relative to said main shaft;

a flywheel supported on said main shaft for rotation relative to said main shaft;

a first clutch for engaging said main disk and said first rotating body;

an energy storage means interposed between said first rotating body and said flywheel for storing part of a total rotational energy of said main shaft temporarily as elastic energy and transmitting the total rotational energy to said flywheel, and for storing part of the total rotational energy of said flywheel temporarily as elastic energy and transmitting the rotational energy of said flywheel to said main shaft; and a second rotating body mounted on said main shaft for rotation relative to said main shaft and interconnected with said main shaft by a reversing mechanism, and a second clutch for selectively engaging said first rotating body with said second rotating body;

wherein said first rotating body comprises first and second flanges, said first clutch including a first clutch plate fixed to said first flange for selectively engaging said main disk, said second clutch including a second clutch plate fixed to said second flange for selectively engaging said second rotating body.

15. The kinetic energy regenerating device according to claim 14, wherein said first and second clutch plates are magnetic clutch plates, a first coil supported on an opposite side of said main disk from said first clutch plate, and a second coil supported on an opposite side of said second rotating body from said second clutch plate, said first and second magnetic clutch plates selectively engaging and disengaging said main disk and second rotating body, respectively.

16. The kinetic energy regenerating device according to claim 14, wherein said flywheel is rotatably mounted on said first rotating body between said first and second flanges.

17. The kinetic energy regenerating device according to claim 16, wherein the reversing mechanism comprises a gear wheel formed integrally with the second rotating body, a first intermediate gear wheel engaging the gear wheel formed integrally with the second rotating body, a second intermediate gear wheel engaging the first intermediate gear wheel, and a spur gear wheel fixedly mounted on the main shaft so as to be in engagement with the second intermediate gear wheel, whereby said second rotating body rotates in a reverse direction with respect to said main shaft.

18. A kinetic energy regenerating device comprising:

a main shaft;

a main disk fixedly mounted on said main shaft;

a first rotating body supported on said main shaft for rotation relative to said main shaft;

a flywheel supported on said main shaft for rotation relative to said main shaft;

a first electromagnetic clutch for engaging said main disk and said first rotating body;

an energy storage means interposed between said first rotating body and said flywheel for storing part of a total amount of rotational energy of said main shaft temporarily as elastic energy and transmitting the total amount of rotational energy to said flywheel, and for storing part of the total amount of rotational energy of said flywheel temporarily as elastic energy and transmitting the rotational energy of said flywheel to said main shaft;

a second rotating body mounted on said main shaft for rotation relative to said main shaft and interconnected with said main shaft by a reversing mechanism so as to rotate in a direction reverse to a direction of rotation of the main shaft; and a second electromagnetic clutch for engaging said first rotating body and said second rotating body.

19. The kinetic energy regenerating device according to claim 18, wherein the energy storage means is a coil-shaped torsion spring.

20. The kinetic energy regenerating device comprising:

a main shaft;

a main disk fixedly mounted on said main shaft;

a first rotating body supported on said main shaft for rotation relative to said main shaft;

a flywheel supported on said main shaft for rotation relative to said main shaft;

a first clutch for engaging said main disk and said first rotating body;

an energy storage means interposed between said first rotating body and said flywheel for storing part of a total amount of rotational energy of said main shaft temporarily as elastic energy and transmitting the total amount of rotational energy to said flywheel, and for storing part of the total amount of rotational energy of said flywheel temporarily as elastic energy and transmitting the rotational energy of said flywheel to said main shaft;

a second rotating body mounted on said main shaft for rotation relative to said main shaft and interconnected with the main shaft by a reversing mechanism so as to rotate in a direction reverse to the direction of rotation of said main shaft; and a second clutch for engaging said first rotating body and said second rotating body;

wherein the reversing mechanism comprises: a gear wheel formed integrally with the second rotating body, a first intermediate gear wheel engaging the gear wheel formed integrally with the second rotating body, a second intermediate gear wheel engaging the first intermediate gear wheel, and a spur gear wheel fixedly mounted on the main shaft so as to be in engagement with the second intermediate gear wheel.

21. The kinetic energy regenerating device according to claim 20, wherein the energy storage means is a coiled-shaped torsion spring.

* * * * *